United States Patent [19]

Sandell et al.

[11] Patent Number: 5,453,622
[45] Date of Patent: * Sep. 26, 1995

[54] WIDE-ANGLE MOTION DETECTOR WITH CLOSE-IN, PRISMOIDAL REFLECTOR

[75] Inventors: Donald R. Sandell, San Jose; Wade P. Lee, Lafayette both of Calif.

[73] Assignee: Larry C. Y. Lee, Hayward, Calif.

[*] Notice: The portion of the term of this patent subsequent to May 23, 2002 has been disclaimed.

[21] Appl. No.: 312,998

[22] Filed: Sep. 30, 1994

Related U.S. Application Data

[63] Continuation-in-part of Ser. No. 132,102, Oct. 5, 1993, abandoned.

[51] Int. Cl.$^6$ ........................................................ G01J 5/08
[52] U.S. Cl. ........................................ 250/353; 250/DIG. 1
[58] Field of Search ........................................ 250/353, 342, 250/DIG. 1

[56] References Cited

U.S. PATENT DOCUMENTS

| | | | |
|---|---|---|---|
| 4,268,752 | 5/1981 | Herwig et al. | 250/353 |
| 4,642,454 | 2/1987 | Carlson | 250/221 |
| 4,644,147 | 2/1987 | Züblin | 250/353 X |
| 4,703,171 | 10/1987 | Kahl et al. | 250/353 X |
| 4,752,769 | 6/1988 | Knaup et al. | 250/353 X |
| 4,778,996 | 10/1988 | Baldwin et al. | 250/353 |
| 5,066,855 | 11/1991 | Lee | 250/DIG. 1 X |
| 5,103,346 | 4/1992 | Chang | 250/DIG. 1 X |
| 5,222,632 | 7/1993 | Armstrong et al. | 250/353 |
| 5,227,632 | 7/1993 | Armstrong et al. | 250/353 |
| 5,266,807 | 11/1993 | Neiger | 250/353 |
| 5,266,867 | 11/1993 | Neiger | 250/353 |
| 5,308,985 | 5/1994 | Lee | 250/DIG. 1 X |

FOREIGN PATENT DOCUMENTS

| | | | |
|---|---|---|---|
| 3732230 | 4/1989 | Germany . | |
| 4011453 | 10/1991 | Germany | 250/342 |
| 0542170 | 5/1993 | Germany . | |

Primary Examiner—Carolyn E. Fields
Assistant Examiner—Edward J. Glick
Attorney, Agent, or Firm—Elliot B. Aronson

[57] ABSTRACT

A passive infra-red motion detector with wide field of view extending to greater than 180 degrees that can be achieved in a cost-effective manner using a single sensor. The motion detector includes a generally prismoidal infra-red mirror having two angled reflecting surfaces forming an apex, which apex may be truncated. The prismoidal reflecting surfaces and their apex are positioned close to and overlying at least a portion of the motion detector sensor and the apex is spaced apart from the sensor at most a distance comparable to a characteristic transverse dimension of the sensor. Because of the close proximity of the mirror to the sensor, the area of the reflecting surfaces need not be very large and may be made comparatively small. The mirror surfaces deflect infrared energy from a suitable arrangement of lenses or other focusing elements onto the sensor from a plurality of zones so as to extend the lateral extremities of the motion detector field of view. Configured in this way, motion detectors may be provided with viewing angles at least up to 220 degrees using a single sensor. In its overlying position the mirror head obstructs at least a portion of the sensor. Another portion of the sensor may be left unobstructed, and additional reflecting or focusing surfaces may also be provided on the same mirror head for directing radiation to the unobstructed sensor portion. The mirror head may be formed together with a base from a single member, which also is shaped to receive and hold an integrated-circuit sensor package. The unitary mirror head and base portion can be mounted directly on a printed circuit board and the mirror is automatically aligned correctly over the sensor.

24 Claims, 4 Drawing Sheets

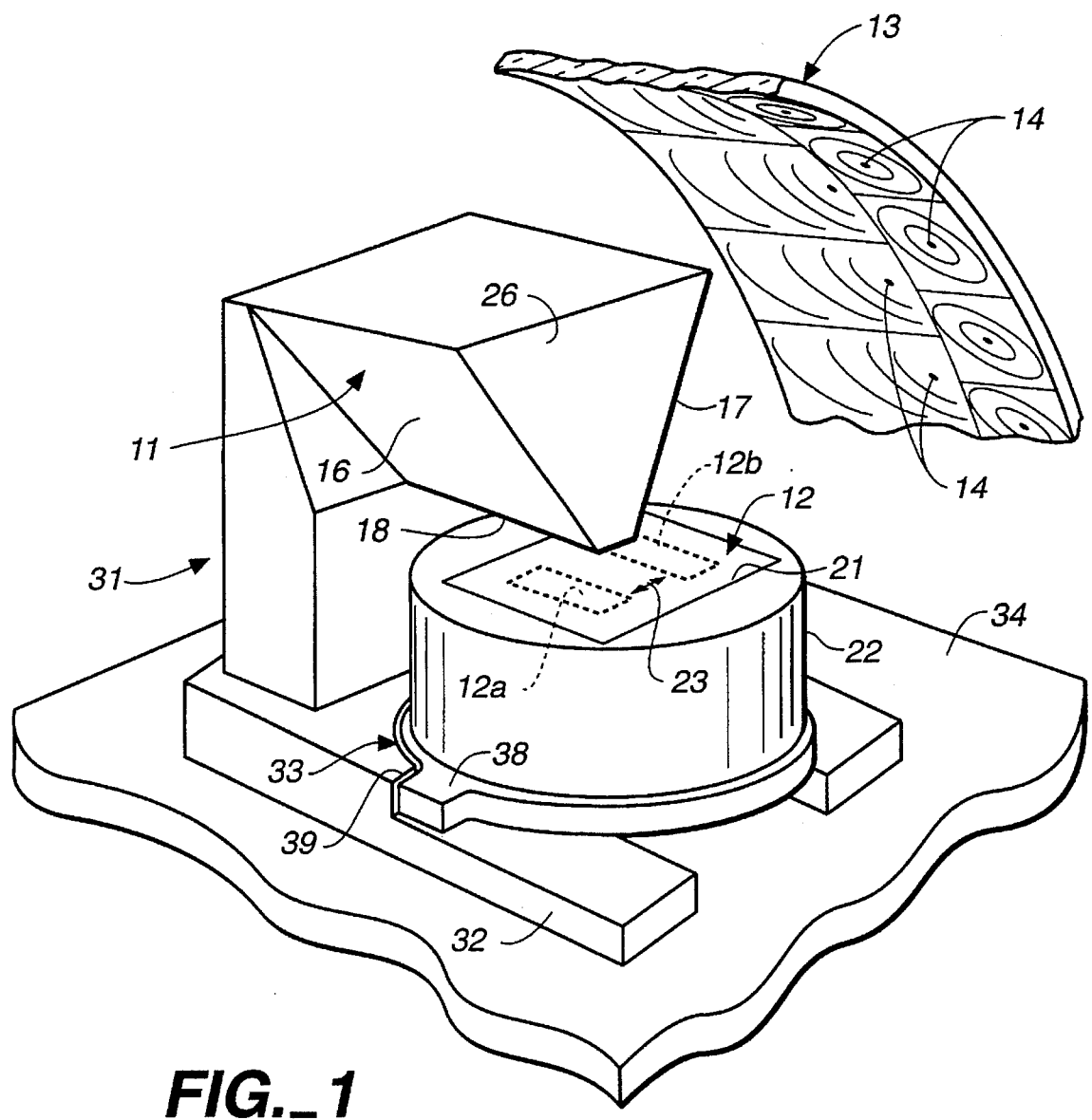
FIG._1

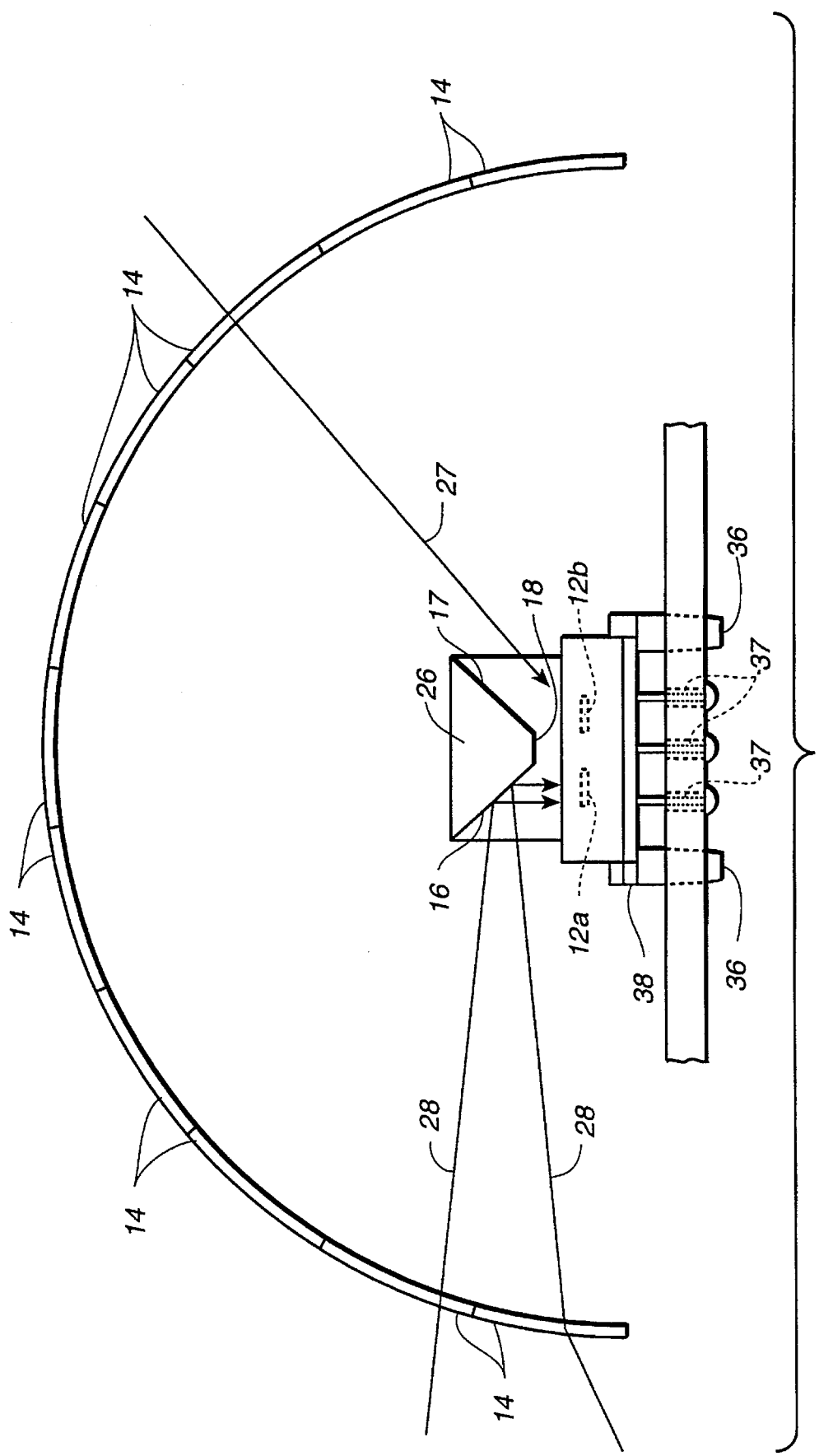
FIG._2

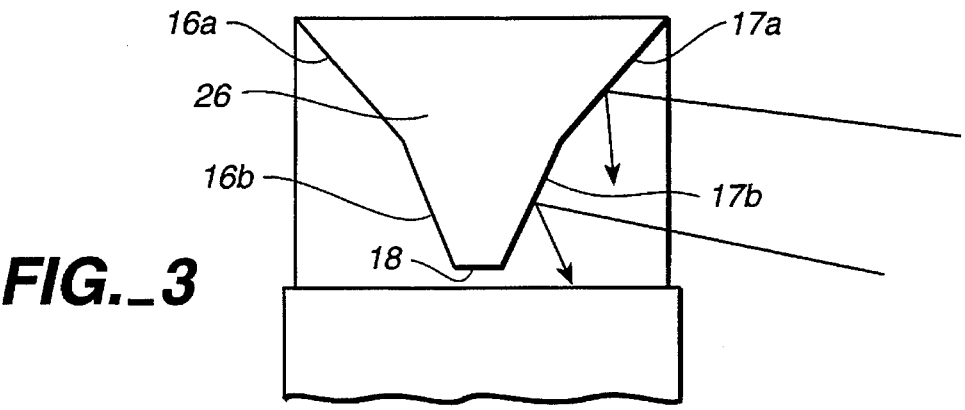
FIG._3
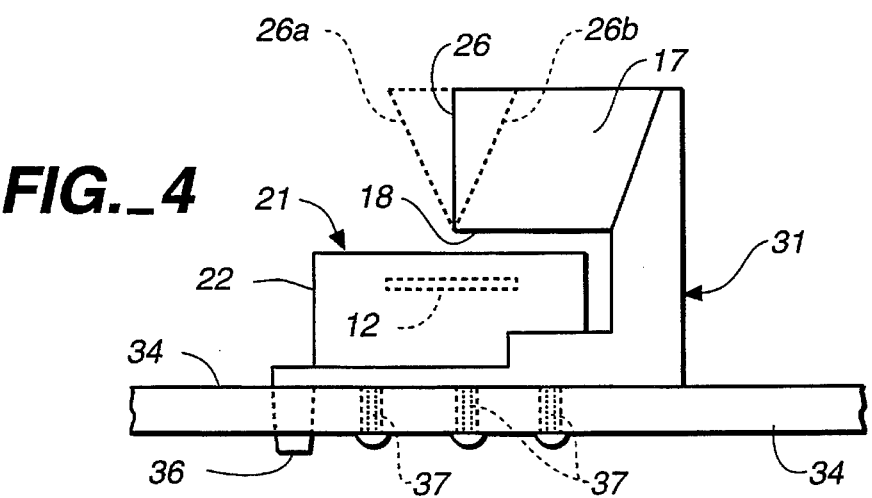
FIG._4
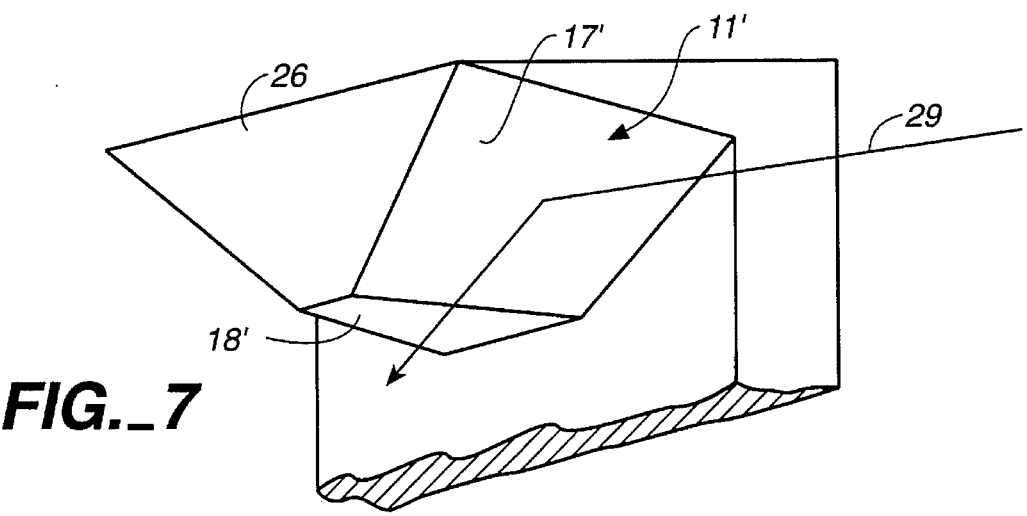
FIG._7

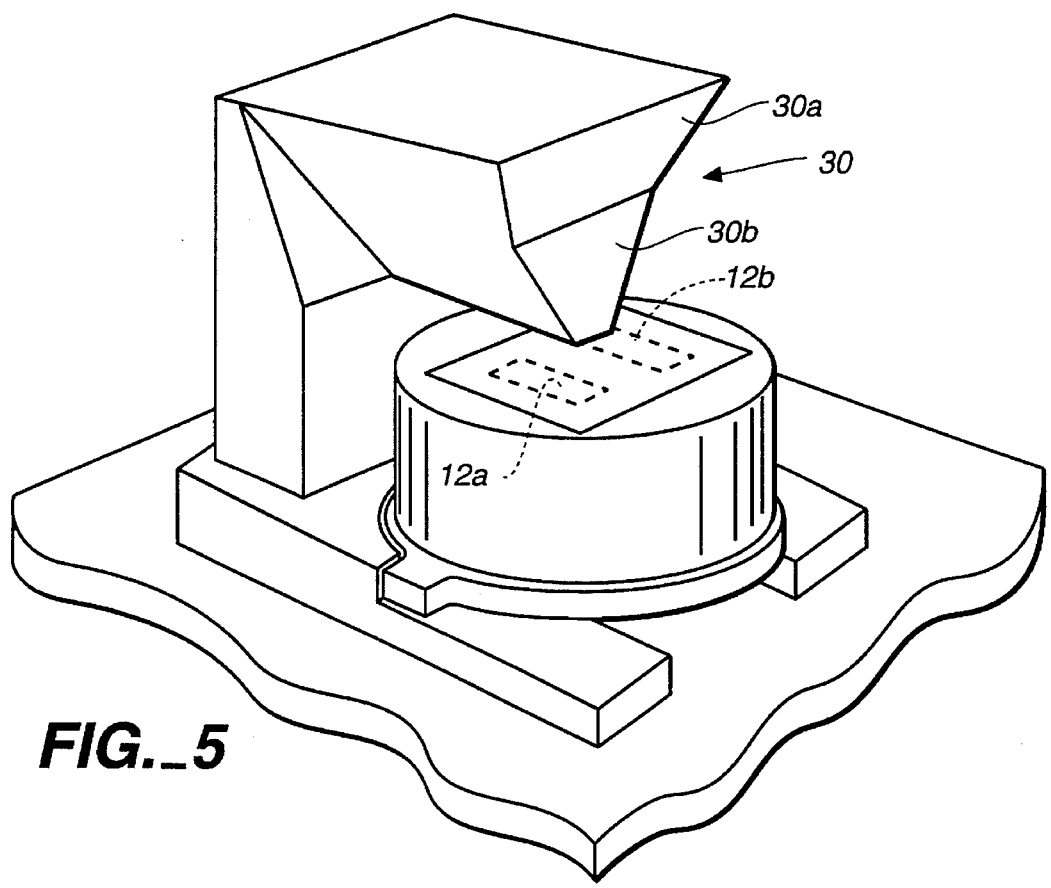
FIG._5
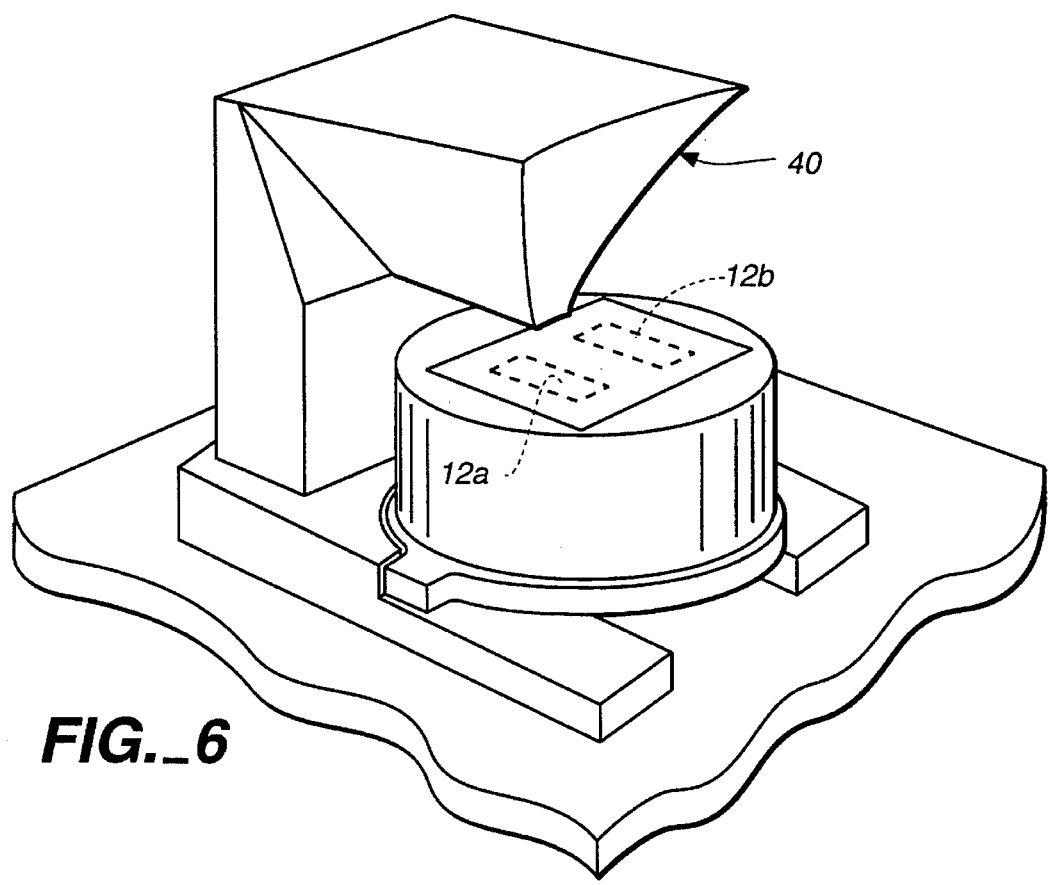
FIG._6

WIDE-ANGLE MOTION DETECTOR WITH CLOSE-IN, PRISMOIDAL REFLECTOR

BACKGROUND OF THE INVENTION

This is a continuation in part of application Ser. No. 08/132,102 filed Oct. 5, 1993, now abandoned.

The present invention relates to passive infra-red motion detection devices and is particularly directed to optical arrangements for achieving a wide field of view.

Infrared motion detection devices are commonly used in automatic light switches and security systems to turn on a light or to activate some other form of alarm or warning indicator when a person or motor vehicle enters a monitored area. Such devices may be used in residential lighting, for example, to illuminate a walkway as a person approaches the front door or to illuminate a driveway as a car approaches. They are also popular as energy saving devices in large office buildings or industrial plants, which may have hundreds of rooms to be illuminated day and night. The motion detection devices can save considerable energy and cost by automatically extinguishing the lights in unoccupied rooms.

The devices function by sensing heat, in the form of infra-red radiation, emanating from a person or similarly warm object as the person or object enters or moves about in the field of view of the device. An arrangement of mirrors and/or lenses directs the incident infra-red radiation to a sensor assembly that may include one or more sensors. When the sensor assembly detects an appropriate heat impulse, the device provides an electrical signal to activate the light or other alarm. A common configuration includes an array of individual lenslets, in which each lenslet focuses infra-red radiation from a particular spatial zone of limited extent to one or more sensors. The field of view of the motion detector is the region of space spanned by the totality of these zones. It is by means of these zones that the motion detector is able to detect motion. In a simple embodiment the motion detector turns on a light or provides other indication whenever a person or other warm object enters a single zone. In more complex embodiments the motion detector can be configured to turn on the light only when the warm object sequentially enters and exits a specified number of zones. In this way the motion detector detects movement within its field of view by detecting the heat from the moving object as it enters and exits one or more individual zones in the field of view. The light is typically turned off automatically if no movement is detected within a specified time interval.

There is presently a need for low-cost motion detectors with wide fields of view for monitoring larger areas exceeding the 110-degree field of view commonly found in motion detectors today. Increasing the field of view requires extending the zonal structure to greater areas. To date, this has been achieved by using complicated optics arrangements to direct the radiation from the wide field of view to one or more sensors. Others have achieved wider fields of view by compounding a plurality of detectors, each having a limited field of view, with optical arrangements that bring the incident radiation to the proper sensor. The provision of motion detectors with wide fields of view, however, has generally involved an increase in cost or a compromise in performance or both.

SUMMARY OF THE INVENTION

The present invention provides a motion detector with wide field of view which may extend to greater than 180 degrees and which may be achieved in a particularly cost-effective manner using a single sensor. The invention provides a form of pdsmoidal mirror which is positioned particularly close to the motion detector sensor so as to form additional zones of sensitivity at outlying angles, which may increase the angular sweep of the motion detector's field of view to greater than 180 degrees. The disposition and small size of the prismoidal mirror lead to considerable cost savings.

Briefly, a motion detector formed according to the invention includes a generally prismoidal infra-red mirror having two angled reflecting surfaces forming an apex, which apex may be truncated. The pdsmoidal reflecting surfaces and their apex are positioned close to and overlying at least a portion of the motion detector sensor and the apex is spaced apart from the sensor at most a distance comparable to a characteristic transverse dimension of the sensor. Because of the close proximity of the mirror to the sensor, the area of the reflecting surfaces need not be greater than about three times the area of the sensor. The mirror surfaces deflect infrared energy from a suitable focusing means onto the sensor from a plurality of zones so as to extend the lateral extremities of the motion detector field of view. Configured in this way, motion detectors may be provided with viewing angles at least up to 220 degrees using a single sensor. In its overlying position the mirror head obstructs at least a portion of the sensor. Another portion of the sensor may be left unobstructed, and additional reflecting or focusing surfaces may also be provided on the same mirror head for directing radiation to the unobstructed sensor portion. The mirror head may be formed together with a base from a single member, which also is shaped to receive and hold an integrated-circuit sensor package. The unitary mirror head and base portion can be mounted directly on a printed circuit board and the mirror is automatically aligned correctly over the sensor.

Other aspects, advantages, and novel features of the invention are described below or will be readily apparent to those skilled in the art from the following specifications and drawings of illustrative embodiments.

BRIEF DESCRIPTION OF THE DRAWINGS

FIG. 1 is an overall cut-away perspective view of a motion detector according to the invention;

FIG. 2 is an end elevational view of the motion detector of FIG. 1.

FIG. 3 is an end elevational view of an alternative embodiment of a prismoidal mirror for use with the invention.

FIG. 4 is a side elevational view of the motion detector of FIG. 1 showing alternative embodiments in phantom.

FIG. 5 is a perspective view of an alternative embodiment of a pdsmoidal mirror having a third, multi-faceted face.

FIG. 6 is a perspective view of an alterative embodiment of a prismoidal mirror having a third, curved focusing face.

FIG. 7 is a perspective view of an another alterative embodiment of a pdsmoidal mirror for use with the invention.

DETAILED DESCRIPTION OF ILLUSTRATIVE EMBODIMENTS

FIG. 1 illustrates an embodiment of a wide-angle passive infra-red motion detector according to the invention. For clarity of exposition the motion detectors external housing has been omitted so that the selected components of the motion detector needed for the exposition below will be plainly visible.

The motion detector embodiment of FIG. 1 includes a prismoidal mirror 11 for reflecting infra-red radiation to a planar infra-red sensor 12. A segmented Fresnel lens array 13 defining a plurality of individual Fresnel lenslets 14 directs radiation from the field of view of the motion detector to mirror 11 and sensor 12. Those skilled in the art of motion detector optics will appreciate from the following descriptions that the benefits of the invention may be achieved with other focusing means besides the segmented Fresnel lens, although the Fresnel lens is advantageous for example because of its compactness, durability and low manufacturing cost.

Mirror 11 has the general shape of a prism comprising two inclined reflecting faces 16 and 17, which are disposed at an angle to one another so that their ends proximal to sensor 12 define a linearly extending apex 18. Although a prism is defined in the field of geometry to have planar faces intersecting in a straight line to form the prism's apex, mirror 11 may depart somewhat from this geometrical definition and still provide the benefits of the invention, and in some instances indicated below may even enhance the benefits of the invention. For example, the apex need not form a sharp straight line, but may be truncated as illustrated in FIGS. 1, 2, 3 and 7. It has been found that mirror 11 exhibits no appreciable loss in performance when the apex 18 is slightly truncated. However, truncating the apex in the manner illustrated in the figures may lead to lower manufacturing cost and may be preferred for that reason. In addition, each individual reflecting face 16 and 17 need not be strictly planar, but may include several planar reflecting facets, such as the two planar reflecting facets 16a, 16b and 17a, 17b illustrated in FIG. 3. Because mirror 11 may depart from the geometrical definition of a prism in these ways and retain the advantages of the invention, the mirror shape is referred to herein as "generally prismoidal" to encompass such alternate geometries.

The invention is able to achieve its wider field of view and lower cost due in great part to the size and positioning of generally prismoidal mirror 11. As seen in FIG. 1, mirror 11 is positioned with its apex extending over sensor 12 so that the mirror overlies and hence obstructs at least a portion of the sensor surface. The apex is desirably placed as close as possible to the face of sensor 12 without contacting the sensor face. "Sensor face" means, of course, the outer surface presented by the sensor package, which is usually the surface of a protective window overlying the sensor. Contact between the mirror apex and the sensor surface is to be avoided because it could transmit mechanical vibration, which in turn could cause false activation. The close mirror positioning permits the mirror reflecting faces to be much smaller, which contributes to the cost savings. In addition, with this spacing a poorer quality, and hence lower cost, mirror may be used because the effect of imperfections in the mirror surface will be minimized. While it would ordinarily seem counterproductive to obstruct a portion of the sensor surface from direct illumination by infra-red radiation, in this obstructing position the mirror may be brought in significantly closer to the sensor surface to produce acceptable performance at significant cost savings.

The individual lenslets 14 focus infra-red radiation from their associated spatial zones of sensitivity to sensor 12. When a mirror surface is placed at an angle in the path of an infra-red beam from a lenslet, the beam illuminates an elliptical region on the mirror surface as it is reflected to the sensor. Because of the close proximity of the reflecting faces of mirror 11 to sensor 12, the illuminated ellipse in the present invention is quite small. The surface of reflecting faces 16 and 17 should present a large enough planar area to reflect such an illumination ellipse but need not be any larger. Those skilled in the art of infra-red motion detector optics will readily be able to determine the minimum necessary size of a reflecting face empirically given a specific configuration of sensor size, mirror angle, mirror position, and focal length of the focusing means. In general, however, the surface area of a planar reflecting face disposed according to the invention need be no larger than about three times the sensitive area of the sensor for any practical configuration.

A readily available sensor commonly used in infra-red motion detectors is in the form of an integrated-circuit sensor chip such as depicted in FIG. 1 having a viewing window 21 that includes two side-by-side sensor elements 12a and 12b sealed in an integrated-circuit package 22. The two sensor elements are separated by a linear gap 23. As presently available in commercial detector chips, sensor elements 12a and 12b each have dimensions of about 1 mm by 3 mm and gap 23 is about 1 mm. Thus the size of the array of sensor elements 12a and 12b in such chips may be characterized by the transverse dimension of three millimeters. As a general measure, the proximal ends of the reflecting faces, that is, apex 18, of mirror 11 should be positioned spaced apart from sensor 12 by a distance at most equal to the characteristic transverse dimension of the sensor 12, in this case equal to the aggregate three-millimeter width of the two sensor elements and gap. Where apex 18 is truncated, mirror 11 may be brought in closer to the sensor. The width of the truncation is preferably no greater than the width of gap 23 and the truncated apex is preferably spaced apart from the sensor over the gap by a distance no greater than one-half the width of the gap. That is, for the dimensions of common commercially available detector chips, the width of the truncation is no greater than about 1 mm and the apex need be spaced apart from the chip surface by no greater than 0.5 mm.

As indicated above in reference to the alternative embodiment of FIG. 3, the reflecting faces 16 and 17 need not be planar, but may each be composed of two reflecting planar facets 16a, 16b and 17a, 17b, respectively. Such facets are desirable to highlight certain areas in the field of view. The upper facets 16a and 17a in FIG. 3, for example, serve to provide greater coverage at the lateral extremities of the reflected field of view.

Also as indicated above, a motion detector according to the invention is able to use a smaller and less expensive mirror because the mirror is positioned to overlie and hence obstruct at least a portion of the sensor. Depending on sensor size, however, it is not necessary that the mirror completely overlie the sensor. In one embodiment of the invention the mirror end face 26 lies midway over the sensor so that mirror 12 obstructs only a first portion of the sensor and leaves a second portion unobstructed. The unobstructed portion of the sensor may then receive focused infra-red radiation directly from Fresnel lens 13 as represented by ray 27 in FIG. 2 while the obstructed portion is positioned to receive reflected infra-red radiation as represented by rays 28 in FIG. 2. In this way the motion detector is able to recapture some of the dead space in the field of view that would otherwise be created by a fully obstructing mirror. End face 26 may be positioned over the sensor to adjust the relative sensitivity of the direct and reflected energy input to the sensor.

FIG. 7 shows an alterative embodiment of a mirror 11' for use when the mirror only partially obstructs the underlying sensor. In the embodiment of FIG. 7 the reflecting faces of mirror 11' are disposed so as to reflect an incident lateral ray in a slightly forward direction as well as downward to the sensor. To achieve this, the reflecting faces are spread outward from one another in the direction of the back end of the reflecting faces, i.e., the end opposite the front face 26. The forwardly angled reflecting faces may alternatively be pictured by imagining the reflecting faces to meet in a sharp apex (i.e., an untruncated apex). The mirror is raised at its front end so that the front end of the untruncated apex is higher than the back end. In FIG. 7 the apex 18' is truncated parallel to the sensor surface to permit the reflecting faces to be brought in closer to the sensor surface. Because of the forward-reflecting tilt of the reflecting faces in this embodiment, the back end of truncated apex 18' is wider than the front end. The result is that light following ray path 29 is reflected downward toward the sensor surface and somewhat forward. Directed slightly forward in this manner, a ray may not only strike the obstructed portion of the sensor directly underlying the reflecting face, but may also be incident upon the unobstructed sensor portion. Thus the slight forward angulation given to the mirror reflecting faces serves to enhance the optical gain of rays reflected from the mirror's lateral faces.

End face 26 may also be formed to provide a third reflecting face. This face may alternatively be angled toward or away from the unobstructed portion of the sensor such as illustrated by the faces 26a and 26b in FIG. 4. When inclined toward the otherwise unobstructed portion, face 26a effectively extends the motion detector's field of view in a direction generally to the left in FIG. 4, i.e., generally in the direction of face 26. Alternatively, when the field of view extension generated by face 26a is not needed, the face may advantageously be angled away from the unobstructed portion of the sensor as is face 26b. With a face 26 oriented perpendicular to the sensor surface, it is possible that face 26 may reflect a certain amount of radiation to the unobstructed sensor portion that is intended to receive direct radiation. In this configuration such incidental reflected radiation is undesirable because the sensor could confuse it with the desired direct radiation, which emanates from a different direction. Inclining face 26b as shown in FIG. 4 diverts such incidental reflected radiation away from the sensor and thereby effectively enhances the sensitivity to direct irradiation. The end face need not be planar. As illustrated in FIG. 5 reflecting end face 30 may also comprise two or more reflecting facets 30a and 30b.

Because of the small size of mirror 11 permitted by the invention, the mirror and its mounting may be formed of a single unitary member indicated generally at 31 in FIG. 1. The upper portion of member 31 defines the mirror and the base portion 32 of member 31 defines a mounting. As illustrated in FIG. 1, base portion 32 is formed with a recessed portion indicated generally at 33 to receive and cradle integrated-circuit package 22 containing the sensor. Member 31 is mounted on a mounting board 34, which is typically provided by a printed circuit board although other types of mounting could also be used. Base portion 32 is formed with two pegs 36 which extend through holes in mounting board 34 to fix member 31 in position on board 34. The integrated-circuit sensor chip is provided with leads 37 for electrical and mechanical connection to the printed circuit board. Leads 37 extend through holes in the printed circuit board and are secured by soldering to circuit traces on the underside of the board. When integrated-circuit package 22 sits in the receiving portion 33 of member 31 leads 37 extend between the two feet of base portion 32 illustrated in FIG. 1 and through the printed circuit board where they fix both the sensor chip and member 31 to the printed circuit board and maintain the chip and mirror in fixed relative position.

It is important for proper operation of the motion detector that the reflecting faces of mirror 11 be aligned correctly with the underlying sensor 12. To assure proper sensor alignment, integrated-circuit sensor packages are typically provided with an indexing tab 38. Member 31 is formed with a corresponding indexing recess 39 for positioning indexing tab 38. Because of the unitary structure of member 31, i.e., of mirror 11 and base portion 32, the single operation of lining up indexing tab 38 on the sensor with recess 39 on the base portion automatically assures proper alignment of the mirror over the sensor elements. This simplifies the assembly process and leads to further savings in time and parts needed in mass production of the motion detectors.

Mirror 11 may be formed of any substance capable of specular reflection in the infrared energy range, for example, aluminum, chrome-plated plastic, or gold. Thus, for example, member 31 may be produced by a low-cost plastic fabrication method, and the reflecting faces may be plated with an appropriate reflecting layer. Alternatively, member 31 may be formed of low-cost infra-red reflecting material.

The alternative embodiments of FIG. 4 contemplate that the focusing means 13 be configured to focus infra-red radiation to the unobstructed end portion of sensor 12. For the third reflecting face 26 and 26b focusing means 13 focuses the radiation directly to the unobstructed sensor portion; for the reflecting face 26a the focusing means may direct radiation first to the end face 26a. The focusing means of course must also extend sufficiently far in the lateral directions to direct infra-red radiation from the lateral reaches of the wide field of view to the two principal reflecting faces 16 and 17 of the prismoidal mirror. For some configurations it may not be cost effective to produce a focusing means that provides the wide lateral reach of the field of view and also covers the unobstructed end portion of the sensor. FIG. 6 shows an alternative embodiment of end reflecting face 41 that also serves to focus radiation onto the unobstructed sensor portion. In FIG. 6 end mirror 41 has a curved form such as a spherical or parabolic form to reflect and focus radiation onto the sensor. Notwithstanding the small size of the mirror head, achievable because of the close proximity of the mirror and sensor, the third face 41 may nevertheless be formed with sufficient focusing power that focusing means 13 is not needed to direct radiation to the unobstructed sensor end portion.

The above descriptions and drawings disclose illustrative embodiments of the invention. Given the benefit of this disclosure, those skilled in the art will appreciate that various modifications, alternate constructions, and equivalents may also be employed to achieve the advantages of the invention. Therefore, the invention is not to be limited to the above description and illustrations, but is defined by the appended claims.

What is claimed is:

1. A passive infra-red motion detector having a wide-angle field of view comprising:

a generally prismoidal infra-red mirror having two reflecting faces disposed at an angle to one another to define a linearly extending apex;

an integrated-circuit sensor package including a housing and a planar infra-red sensor within said housing, said sensor having a characteristic dimension in a direction transverse to said apex;

wherein said mirror is positioned externally to said sensor package with said apex pointing toward said sensor and spaced apart from said package at most a distance comparable to the characteristic transverse dimension of said sensor, said two reflecting faces being arranged to direct infrared radiation to said sensor;

wherein said mirror and said apex are further positioned to overlie at least a portion of said sensor; and focusing means configured to direct infra-red radiation from a plurality of zones in said field of view to said two reflecting faces for reflection to said sensor.

2. The motion detector of claim 1 wherein said mirror is truncated along said linearly extending apex.

3. The motion detector of claim 1 wherein each of said reflecting faces has a reflecting area at most three times the area of said sensor.

4. The motion detector of claim 1 wherein said mirror and apex are positioned to overlie only a first portion of said sensor and to leave a second portion of said sensor unobstructed; and said focusing means is arranged to direct infra-red radiation directly to said unobstructed portion of said sensor.

5. The motion detector of claim 4 wherein said two reflecting faces are tilted so as to direct at least a portion of radiation incident thereon to said first and second portions of said sensor.

6. The motion detector of claim 1 wherein said motion detector includes a mounting board on which said integrated-circuit sensor package is mounted, and said motion detector further comprises:

a member having a base portion mounted on said mounting board in the vicinity of said integrated-circuit sensor package and an upper portion defining said generally pdsmoidal mirror.

7. The motion detector of claim 6 wherein the base portion of said member is formed to receive said integrated-circuit sensor package, whereby said sensor is held in fixed relation to said mirror.

8. The motion detector of claim 7 wherein said base portion and said integrated-circuit sensor package are indexed to define a fixed alignment of said mirror with respect to said sensor.

9. The motion detector of claim 8 wherein said mirror and apex are positioned to overlie only a first portion of said sensor and to leave a second portion of said sensor unobstructed; and said focusing means is arranged to direct infra-red radiation directly to said unobstructed portion of said sensor.

10. The motion detector of claim 1 wherein said two reflecting faces each comprises at least two distinct planar reflecting facets.

11. A passive infra-red motion detector having a wide-angle field of view comprising:

a generally prismoidal infra-red mirror having two reflecting faces disposed at an angle to one another to define a linearly extending apex;

a planar infra-red sensor having a characteristic dimension in a direction transverse to said apex;

wherein said mirror is positioned with said apex pointing toward said sensor and spaced apart therefrom at most a distance comparable to the characteristic transverse dimension of said sensor, said two reflecting faces being arranged to direct infrared radiation to said sensor;

wherein said mirror and said apex are further positioned to overlie at least a portion of said sensor; and focusing means configured to direct infra-red radiation from a plurality of zones in said field of view to said two reflecting faces for reflection to said sensor;

wherein said mirror and apex are positioned to overlie only a first portion of said sensor and to leave a second portion of said sensor unobstructed; and said focusing means is arranged to direct infra-red radiation directly to said unobstructed portion of said sensor; and wherein said mirror further comprises a third reflecting face transverse to said linearly extending apex and to said two reflecting faces, said third reflecting face being inclined toward said unobstructed sensor portion so as to reflect infra-red radiation toward said unobstructed portion thereby to extend the field of view of said motion detector in the direction of said third reflecting face.

12. A passive infra-red motion detector having a wide-angle field of view comprising:

a generally prismoidal infra-red mirror having two reflecting faces disposed at an angle to one another to define a linearly extending apex;

a planar infra-red sensor having a characteristic dimension in a direction transverse to said apex;

wherein said mirror is positioned with said apex pointing toward said sensor and spaced apart therefrom at most a distance comparable to the characteristic transverse dimension of said sensor, said two reflecting faces being arranged to direct infrared radiation to said sensor;

wherein said mirror and said apex are further positioned to overlie at least a portion of said sensor; and focusing means configured to direct infra-red radiation from a plurality of zones in said field of view to said two reflecting faces for reflection to said sensor;

wherein said mirror and apex are positioned to overlie only a first portion of said sensor and to leave a second portion of said sensor unobstructed; and said focusing means is arranged to direct infra-red radiation directly to said unobstructed portion of said sensor; and wherein said mirror further comprises a third reflecting face transverse to said linearly extending apex and to said two reflecting faces, said third reflecting face being inclined away from said unobstructed sensor portion so as to reflect infra-red radiation away from said unobstructed portion thereby to enhance sensitivity to direct infra-red radiation incident on said sensor.

13. A passive infra-red motion detector having a wide-angle field of view comprising:

a generally pdsmoidal infra-red mirror having two reflecting faces disposed at an angle to one another to define a linearly extending apex;

a planar infra-red sensor having a characteristic dimension in a direction transverse to said apex;

wherein said mirror is positioned with said apex pointing toward said sensor and spaced apart therefrom at most a distance comparable to the characteristic transverse dimension of said sensor, said two reflecting faces being arranged to direct infrared radiation to said sensor;

wherein said mirror and said apex are further positioned to overlie at least a portion of said sensor; and focusing means configured to direct infra-red radiation from a plurality of zones in said field of view to said two reflecting faces for reflection to said sensor;

a mounting board on which said infra-red sensor is mounted;

a member having a base portion mounted on said mounting board in the vicinity of said sensor and an upper portion defining said generally prismoidal mirror;

wherein said infra-red sensor is included in an integrated-circuit package; and the base portion of said member is formed to receive said integrated-circuit package, whereby said sensor is held in fixed relation to said mirror;

wherein said mirror is truncated along said linearly extending apex; and said sensor comprises a pair of side-by-side sensor elements separated by a linear gap, the truncated apex of said mirror has a width no greater than the width of said gap, and said mirror is oriented with said truncated apex overlying said gap.

14. The motion detector of claim 13 wherein said truncated apex is spaced from said integrated-circuit package by a distance no greater than one-half the width of said gap.

15. A passive infra-red motion detector having a wide-angle field of view comprising:

a generally prismoidal infra-red mirror having two reflecting faces disposed at an angle to one another to define a linearly extending apex;

a planar infra-red sensor having a characteristic dimension in a direction transverse to said apex;

wherein said mirror is positioned with said apex pointing toward said sensor and spaced apart therefrom at most a distance comparable to the characteristic transverse dimension of said sensor, said two reflecting faces being arranged to direct infrared radiation to said sensor;

wherein said mirror and said apex are further positioned to overlie at least a portion of said sensor; and focusing means configured to direct infra-red radiation from a plurality of zones in said field of view to said two reflecting faces for reflection to said sensor;

wherein said sensor comprises a pair of side-by-side sensor elements separated by a linear gap and said mirror is oriented with said apex overlying said gap.

16. The motion detector of claim 15 wherein said apex is spaced apart from said sensor by a distance no greater than the aggregate width across said side-by-side sensor elements and said gap.

17. The motion detector of claim 16 wherein said mirror is truncated along said linearly extending apex and the width of the truncated apex is no greater than the width of said gap.

18. The motion detector of claim 16 wherein said mirror is truncated along said linearly extending apex and said truncated apex is spaced from said sensor by a distance no greater than one-half the width of said gap.

19. A passive infra-red motion detector having a wide-angle field of view comprising:

a generally pdsmoidal infra-red mirror having two reflecting faces disposed at an angle to one another to define a linearly extending apex;

a planar infra-red sensor having a characteristic dimension in a direction transverse to said apex;

wherein said mirror is positioned with said apex pointing toward said sensor and spaced apart therefrom at most a distance comparable to the characteristic transverse dimension of said sensor, said two reflecting faces being arranged to direct infrared radiation to said sensor;

wherein said mirror and said apex are further positioned to overlie at least a portion of said sensor; and focusing means configured to direct infra-red radiation from a plurality of zones in said field of view to said two reflecting faces for reflection to said sensor;

wherein said mirror and apex are positioned to overlie only a first portion of said sensor and to leave a second portion of said sensor unobstructed; and said mirror further comprises a third reflecting face transverse to said linearly extending apex and to said two reflecting faces, said third reflecting face comprising a curved focusing surface arranged to reflect and focus infra-red radiation onto said unobstructed portion of said sensor.

20. The motion detector of claim 19 wherein said mirror is truncated along said linearly extending apex.

21. The motion detector of claim 20 wherein said infra-red sensor is included in an integrated-circuit sensor package;

said sensor comprises a pair of side-by-side sensor elements separated by a linear gap, the truncated apex of said mirror has a width no greater than the width of said gap, and said mirror is oriented with said truncated apex overlying said gap;

said motion detector includes a mounting board on which said integrated-circuit sensor package is mounted; and said motion detector further comprises a member having a base portion and an upper portion;

said upper portion defining said generally prismoidal mirror and said third reflecting face; and said base portion being mounted on said mounting board and formed to receive said integrated-circuit sensor package, whereby said sensor is held in fixed relation to said mirror.

22. A passive infra-red motion detector having a wide-angle field of view comprising:

a generally prismoidal infra-red mirror having two reflecting faces disposed at an angle to one another to define a linearly extending apex;

a planar infra-red sensor having a characteristic dimension in a direction transverse to said apex;

wherein said mirror is positioned with said apex pointing toward said sensor and spaced apart therefrom at most a distance comparable to the characteristic transverse dimension of said sensor, said two reflecting faces being arranged to direct infrared radiation to said sensor;

wherein said mirror and said apex are further positioned to overlie at least a portion of said sensor; and focusing means configured to direct infra-red radiation from a plurality of zones in said field of view to said two reflecting faces for reflection to said sensor;

wherein said mirror and apex are positioned to overdo only a first portion of said sensor and to leave a second portion of said sensor unobstructed; and said mirror further comprises a third reflecting face transverse to said linearly extending apex and to said two reflecting faces, said third reflecting face comprising at least two distinct planar reflecting facets.

23. The motion detector of claim 22 wherein said mirror is truncated along said linearly extending apex.

24. The motion detector of claim 23 wherein said sensor comprises a pair of side-by-side sensor elements separated by a linear gap, the truncated apex of said mirror has a width no greater than the width of said gap, and said mirror is oriented with said truncated apex overlying said gap;

said motion detector includes a mounting board on which said infra-red sensor is mounted;

said infra-red sensor is included in an integrated-circuit package; and said motion detector further comprises a member having a base portion and an upper portion;

said upper portion defining said generally pdsmoidal mirror and said third reflecting face; and said base portion being mounted on said mounting board and formed to receive said integrated-circuit package, whereby said sensor is held in fixed relation to said mirror.

* * * * *